United States Patent [19]

Dupuy

[11] Patent Number: 5,659,879
[45] Date of Patent: Aug. 19, 1997

[54] METHOD OF COVERING SHADOW AREAS IN A CELLULAR MOBILE RADIO SYSTEM AND RADIO BOOSTER FOR IMPLEMENTING THIS METHOD

[75] Inventor: Pierre Dupuy, Paris, France

[73] Assignee: Alcatel N.V., Amsterdam, Netherlands

[21] Appl. No.: 278,006

[22] Filed: Jul. 20, 1994

[30] Foreign Application Priority Data

Jul. 30, 1993 [FR] France .................................. 93 09426

[51] Int. Cl.$^6$ ........................................... H04B 7/14
[52] U.S. Cl. .............................. 455/15; 455/20; 455/422
[58] Field of Search .................... 455/9, 10, 11.1, 455/15, 20, 33.1, 33.4, 62, 63

[56] References Cited

U.S. PATENT DOCUMENTS

| | | | |
|---|---|---|---|
| 4,783,843 | 11/1988 | Leff et al. | 455/20 |
| 5,168,574 | 12/1992 | Gordon et al. | 455/9 |
| 5,179,720 | 1/1993 | Grube et al. | 455/20 |

FOREIGN PATENT DOCUMENTS

| | | |
|---|---|---|
| 0041289A1 | 12/1981 | European Pat. Off. . |
| 0406905A2 | 1/1991 | European Pat. Off. . |
| 0535812A2 | 4/1993 | European Pat. Off. . |
| 2253324 | 9/1992 | United Kingdom . |

OTHER PUBLICATIONS

French Search Report FR 9309426.

*Primary Examiner*—Edward F. Urban
*Attorney, Agent, or Firm*—Sughrue, Mion, Zinn, Macpeak & Seas

[57] ABSTRACT

A mobile radio network comprises a base transceiver station for transmitting and receiving radio signals to and from mobiles on different basic frequencies and a radio booster for receiving, amplifying and retransmitting radio signals to and from at least one shadow area. To cover the shadow areas a radio signal received by a radio booster from the base transceiver station on a basic frequency is retransmitted to a mobile station on a translated frequency different from the basic frequency and associated with the latter by a translation law. This law is such that, firstly, each of the basic frequencies is either associated with at least one translated frequency or is not associated with any translated frequency and, secondly, the difference between the value of a translated frequency and the value of the associated basic frequency is not the same for all the translated frequencies. A radio signal received by a radio booster from a mobile on a translated frequency is retransmitted to the base transceiver station on the associated basic frequency.

17 Claims, 4 Drawing Sheets

METHOD OF COVERING SHADOW AREAS IN A CELLULAR MOBILE RADIO SYSTEM AND RADIO BOOSTER FOR IMPLEMENTING THIS METHOD

BACKGROUND OF THE INVENTION

1. Field of the Invention

The present invention concerns a method of covering shadow areas in a cellular mobile radio system and a radio booster for implementing this method.

2. Description of the Prior Art

In cellular mobile radio systems the environment of fixed and mobile transceiver stations includes obstacles due to the terrain or to buildings, for example.

Because radio propagation is more or less directional, radio shadow areas exist in the vicinity of these obstacles, i.e. areas in which radio transmissions can be partially blocked or absorbed by some feature of the environment, with the result that they can be strongly attenuated.

Shadow areas can also exist at the extreme range of the transmitters of the fixed stations of the network.

Accordingly, the signal transmitted can deteriorate significantly.

Various solutions to this problem have been put forward.

A first solution is to use a radio booster comprising a transceiver and an associated antenna provided with an amplifier located in the shadow area. The radio receiver is a broadband receiver, i.e. it can receive and retransmit a major part of the frequency spectrum used in the radio network to which it belongs.

Its function is to receive radio transmissions in the shadow area, to amplify them and then to retransmit them on the same frequency, at a different angle. It is therefore virtually "transparent", i.e. it modifies only the amplitude of the retransmitted signal. The advantage of using a booster is that it is autonomous: no cables have to be connected to the booster. This solution is therefore of low cost.

This solution is unsatisfactory, however, because of a phenomenon similar to the Larsen effect that occurs, especially if the booster is not far away from the fixed transceiver station it relays. The Larsen effect is a spurious oscillation which occurs when the output of an electro-acoustic system, such as the sound from a loudspeaker, for example, impinges on its input, usually the microphone, and the effect produced is a whistling. In the case of radio waves this phenomenon produces interference in the signal transmitted.

One solution to this problem is to use a booster which converts or translates the frequency of the signals received before retransmitting them. A solution of this kind is described in patent application GB-A-2 253 324, for example.

It has been found that this solution is unsatisfactory in the case of cellular mobile radio systems because the base transceiver station cannot determine if frequency translation has been applied unless devices to carry out the converse frequency translation are used at the boundaries between cells, which is costly in hardware. Another solution for cellular mobile radio systems avoids these problems. This solution increases the number of cells, and therefore the number of base transceiver stations, by creating additional cells to cover the shadow areas.

This solution is effective and has the advantage of avoiding the problems that arise with the previous solution.

It has drawbacks of its own, however.

First of all, it is very costly in installation terms because, unlike a radio booster, a cellular network base transceiver station must be connected by cables to a base station controller and to a network operation and maintenance center.

Also, given its complexity, a cellular network base transceiver station is inherently a high cost item.

An object of the present invention is therefore to provide a method of covering shadow areas in a cellular mobile radio system that is not costly to implement but which guarantees good quality radio signals so that the base transceiver stations can determine if the signals received are at a frequency resulting from frequency translation in a booster without needing to use devices to carry out the converse frequency translation.

SUMMARY OF THE INVENTION

To this end the present invention proposes a method of covering shadow areas in a cellular mobile radio system comprising a plurality of cells each covered by a base transceiver station adapted to transmit and to receive radio signals to and from mobile stations in the cell on different basic frequencies, each shadow area being in one of the cells, a radio booster being associated with each of the shadow areas to receive, amplify and retransmit the radio signals to and from mobile stations in the shadow area, the booster adapted to cover a given shadow area being subordinate to the base transceiver station of the cell in which the shadow area is located.

According to the present invention a radio signal received by one of the boosters from the base transceiver station on a basic frequency is retransmitted to one of the mobile stations by the booster on a translated frequency different from the basic frequency and associated therewith by a translation law known to the control means of the base transceiver station.

Conversely, a radio signal received by one of said boosters from one of the mobile stations on a translated frequency is retransmitted to the base transceiver station by the booster on the basic frequency associated with the translated frequency, the frequency of the broadcast control channel of each cell being always associated with a translated broadcast control channel of each of the boosters.

When a mobile station in a shadow area of a cell transmits an access request radio signal on a specific access channel conveyed by a translated broadcast control channel in order to establish a radio connection with the base transceiver station of the cell, so that a traffic channel is assigned to it, the booster adapted to cover the shadow area, after receiving the access request, retransmits it to the base transceiver station on broadcast control channel after modifying it. A control unit, to which the modified access request is retransmitted, is able to determine that the mobile station is in a shadow area, and to deduce the translation law for obtaining the translated frequencies associated with that shadow area, so that the signal transmitted by the control unit and adapted to advise the mobile station which traffic channel and which frequencies it must use to transmit and receive contains the translated frequencies instead of the associated basic frequencies.

Because the frequencies retransmitted undergo frequency translation, the Larsen effect type phenomenon usually encountered with radio boosters does not occur.

The boosters of the invention have several functions. The first of these functions is to translate the received frequencies and a second is to modify the received access requests.

These functions are much simpler than those implemented by a conventional base transceiver station, however, with the result that the hardware cost of a booster used in the method of the invention, although greater than that of a conventional booster, is much less than that of a base transceiver station.

The booster which receives an access request from a mobile station, transmitted by the latter as if it were adjacent the base transceiver station, i.e. with a null timing advance relative to the base transceiver station, retransmits the corresponding modified access request with a so-called partial timing advance corresponding to the distance between it and the mobile station. Therefore the timing advance indicated thereafter by the base transceiver station to the mobile station and to be used by the latter for any subsequent transmission to the base transceiver station is equal to the sum of the partial timing advance and the timing advance corresponding to the distance between the booster and the base transceiver station.

A third function of a booster for implementing the method of the invention is therefore to determine the primary timing advance. This function also enables access requests to be decoded correctly, which is necessary for modifying them in the specific case mentioned above.

It is highly advantageous to enable the booster to retransmit the modified access request to the associated base transceiver station with a non-null timing advance. In this way the base transceiver station can determine directly the total timing advance that the mobile station must use.

Moreover, if frequency hopping is used in a cell in which there is a shadow area and if the booster covering this shadow area uses fewer frequencies than the base transceiver station of the cell, the traffic channel assigned to a mobile station in the shadow area is conveyed either by basic frequencies each having an associated translated frequency or by a channel with no frequency hopping.

A fourth function of boosters in the method of the invention is therefore to apply frequency hopping.

All the translated broadcast control channels of a given broadcast control channel are preferably held in memory in control means.

To prevent interference, the translated frequencies are chosen so that adjoining shadow areas use separate sets of translated frequencies, so that classes of shadow area are defined, a shadow area class comprising all the shadow areas using the same set of translated frequencies and being represented by a translation law different from those representing the other shadow area classes.

If frequency hopping is applied in a cell by means of a so-called repetition law, frequency hopping can then also be applied in the shadow areas in this cell, the repetition laws used by the boosters covering these shadow areas being either identical to or different from the repetition law used by the base transceiver station of the cell, the signalling channel conveyed by the broadcast control channel being always a channel with no frequency hopping, however.

The control unit can then deduce the shadow area class from the modified access request.

If the cellular mobile radio system uses time-division multiple access, the access request can be modified by changing channel, for example: the booster retransmits the access request on a so-called modified access channel whose position in time is different from that of the access channel, the modified access channel being known to the control means as specific to retransmission of access requests from mobile stations in a shadow area of a predetermined class.

This solution is particularly simple to implement.

In this case, the downward channels, i.e. the channels in the direction from the base transceiver station to the mobile stations, associated with the modified access channels are highly advantageously either not used for traffic or used for booster control and monitoring.

If a mobile station in a shadow area accessing a base transceiver station through the booster covering that shadow area must access directly the base transceiver station in whose coverage area that shadow area is located, a handover procedure is carried out.

If a mobile station accessing a base transceiver station, either directly or through a booster covering a first shadow area, must access the booster of a second shadow area, the base transceiver station communicates to the control unit the translated broadcast control channel associated with this second shadow area and the control unit deduce therefrom the translation law required to obtain the translated frequencies associated with the second shadow area, so that the signal transmitted by the control unit to tell the mobile station which traffic channel and which frequencies it must use to transmit and receive contains the translated frequencies used by the booster of the second shadow area rather than the associated basic frequencies.

In an advantageous embodiment of the invention the base transceiver station holds in memory all the translated broadcast control channels related to its broadcast control channel by the translation law.

The translation law is preferably an increasing monotonous function if the radio system uses frequency hopping.

Finally, the translation law to be used by each booster is supplied to it by the network operation and maintenance unit, this law being modifiable.

The present invention also concerns a booster for implementing the method as explained above.

This booster can include:

at least one transceiver, at least one antenna associated with said transceiver, means for translating the frequency of signals received from said mobile stations or said base transceiver stations, means for applying frequency hopping, means for determining the timing advance corresponding to the distance between it and a mobile station, means for modifying access requests from said mobile stations, means for effecting its operation and maintenance by radio from network operation and maintenance means.

Other features and advantages of the present invention emerge in the following description of a method in accordance with the invention and one embodiment of the latter given by way of non-limiting and purely illustrative example only.

DETAILED DESCRIPTION OF THE PREFERRED EMBODIMENT

Items common to more than one figure are always identified by the same reference number.

Throughout the remainder of this description, for reasons of clarity, the method of the invention is described by means of a specific example which is, of course, given purely by way of illustration.

Figure 1:
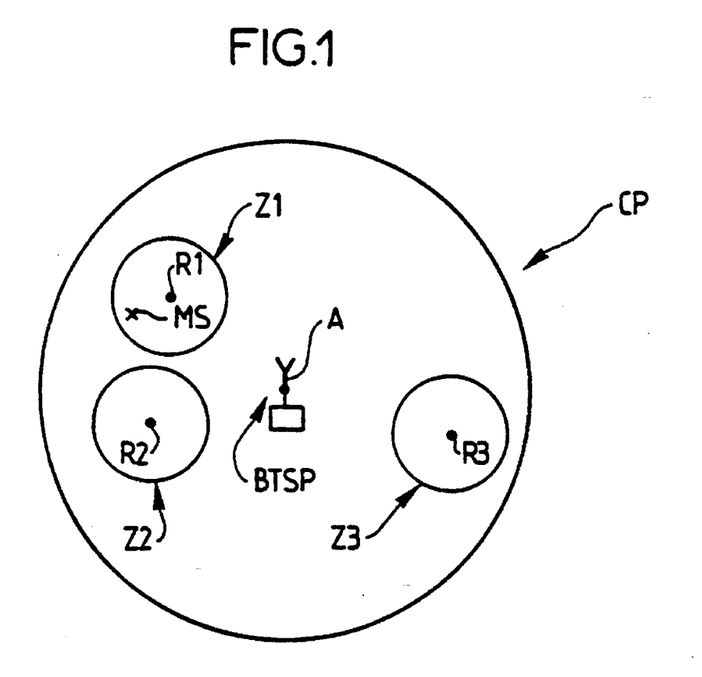
FIG. 1 is a diagram showing the structure of a cell of a cellular mobile radio network, this cell including shadow areas covered by the method of the invention.

This example concerns application of the method of the invention to a cell of a GSM type cellular mobile radio system. FIG. 1 shows an "umbrella" cell CP whose general features are conventional in the GSM system:

it covers a broadly circular geographical area, it has at its center a base transceiver station BTSP which includes a radio transceiver with a transmit and receive antenna A, the base transceiver station BTSP can transmit radio signals on several separate frequencies, referred to as basic frequencies, which are assigned to it when the network is configured in such a way that there is no interference between the cell CP and the adjoining cells (not shown), each frequency reserved for transmission (in the downward direction) being associated with one only separate frequency reserved for reception (in the upward direction); from the protocol point of view, the cell CP is associated with numbers, each number representing a pair of frequencies, i.e. an upward frequency and a downward frequency.

There are various obstacles (not shown) to radio waves in the cell CP and these create shadow areas Z1, Z2, Z3. A respective radio booster R1, R2, R3 is installed at the center of the each shadow area Z1, Z2, Z3, for example. The radio coverage of each booster is shown by a circle.

Figure 2:
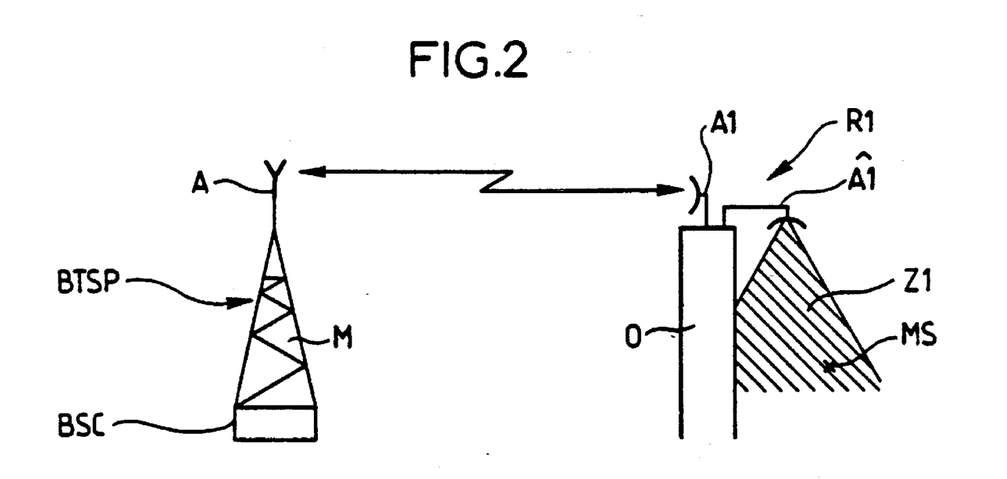
FIG. 2 shows how a booster of the invention can be installed in practise in a shadow area.

FIG. 2 is a simplified representation of the shadow area phenomenon: it shows the base transceiver station BTSP whose antenna A is mounted on a mast M, an obstacle O on top of which is located the booster R1, comprising an antenna A1 disposed to transmit and receive signals to and from the base transceiver station BTSP, and an antenna $\hat{A}1$ for transmitting and receiving radio signals respectively to and from mobile stations provided with transceivers, and in particular one such station MS located in the shadow area Z1 (shaded in FIG. 2) caused by the obstacle O.

It is assumed that four transmit frequencies $f_{P1}$, $f_{P2}$, $f_{P3}$ and $f_{P4}$ are associated with the base transceiver station BTSP. The corresponding receive frequencies are identified by the same alphanumeric symbol but "primed". The frequency of the broadcast control channel of the cell CP is the frequency $f_{P1}$.

There follows a description of the exchange of radio signals between the base transceiver station BTSP and the mobile station MS in the shadow area Z1 in the case of radio signals other than access requests transmitted by the mobile station during the access procedure.

If the base transceiver station BTSP transmits a radio signal to the mobile station MS in the shadow area Z1 on the frequency $f_{P2}$, for example, it is received by the antenna $\hat{A}1$ and then by a receiver RR12 (see FIG. 3) of the booster R1. Before retransmitting this signal to the mobile station MS the booster R1 translates its frequency. This operation is schematically represented by the block T in FIG. 3.

Figure 3:
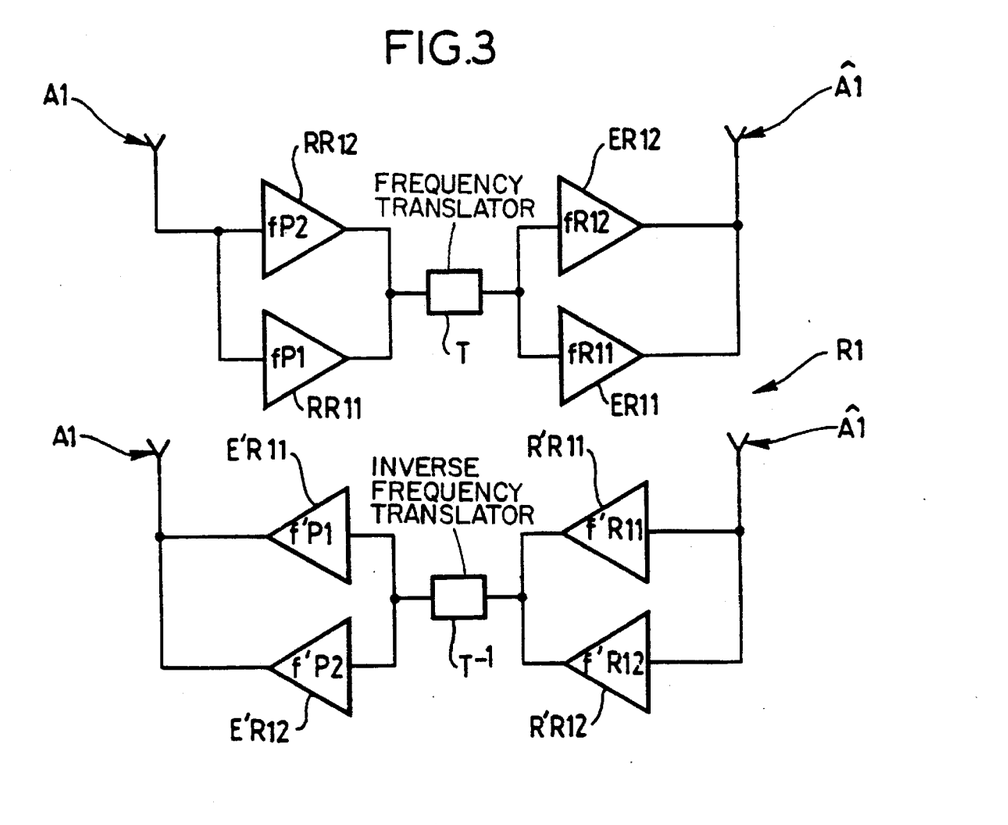
FIG. 3 is a block diagram showing the operation of a booster by the method of the invention in the case of transmission of signals other than access requests or messages.

The signal is then retransmitted to the mobile station MS by the transmitter ER12 and the antenna $\hat{A}1$ of the booster R1 on the translated frequency $f_{R12}$ associated with the frequency $f_{P2}$.

To prevent cochannel interference the frequency $f_{R12}$ is separate from the frequency $f_{P2}$ and all other frequencies associated with the base transceiver station BTSP and all translated frequencies associated with the latter. For the same reason, during configuration of a network using the method of the invention the translated frequencies chosen for each shadow area are made sufficiently far away from those associated with other shadow areas and those of cells adjoining the cell CP.

The translation can be schematically represented by a so-called translation law, such that each of the basic frequencies of the base transceiver station BTSP is either associated with at least one translated frequency (the specific case in which a basic frequency is associated with more than one translated frequency is discussed later) or is not associated with any translated frequency. Also, the difference between the value of a translated frequency and the value of the associated basic frequency must not be the same for all the translated frequencies.

When a transmit frequency is associated with a translated frequency the corresponding received frequency is also associated with a translated frequency.

Also, the frequency of the broadcast control channel must naturally always be associated with a translated frequency, as it conveys the signalling channels. In this example this translated frequency is the frequency $f_{R11}$.

The following description concerns the situation in which a basic frequency is associated with at most one translated frequency.

When a signal from the mobile station MS on the frequency $f'_{R12}$ is received by a receiver $R'_{R12}$ via the antenna A1, the booster R1 applies the converse translation law, this operation being symbolically represented by the block $T^{-1}$ in FIG. 3. It then retransmits this signal on the frequency $f'_{P2}$ to the base transceiver station BTSP by means of a transmitter $E'_{R12}$ and the antenna A1.

To avoid the problems encountered in the prior art the mobile station must use only translated frequencies to transmit and to receive.

The description so far applies to transmission and reception of all signals other than access requests either on the broadcast channel used for traffic or on the other frequencies.

The translation law(s) used (it is not necessary for all the boosters to use the same translation law, and in some cases this is even undesirable, for reasons to be explained later) can be determined once and for all when the network is installed. However, for obvious reasons of flexibility and to allow adaptation to changing call traffic densities, it is preferable to make provision for subsequent modification of these laws.

For example, the translation law(s) can be communicated to the various boosters by a network operation and maintenance center, preferably by radio.

In the GSM system, each base transceiver station is controlled by a base station controller. The latter must hold the translation laws in memory.

The access procedure is described next with reference to FIGS. 3 and 4. In this context, the access procedure is the procedure carried out when a mobile station attempts to access the network the first time after it is powered up, i.e. when it is attempting to connect by radio to a base transceiver station of the network, primarily to send and receive calls.

As a general rule, in a GSM type network each base transceiver station transmits a signalling channel on the broadcast control channel BCCH. As this type of network uses time-division multiple access, this signalling channel is always transmitted by the base transceiver station in the first time slot TS0 of each frame.

When a mobile station attempts to access a base transceiver station it transmits in TS0 an access request (Random Access—RA) signal on the upward broadcast control channel (known as the Random Access CHannel—RACH).

Figure 6:
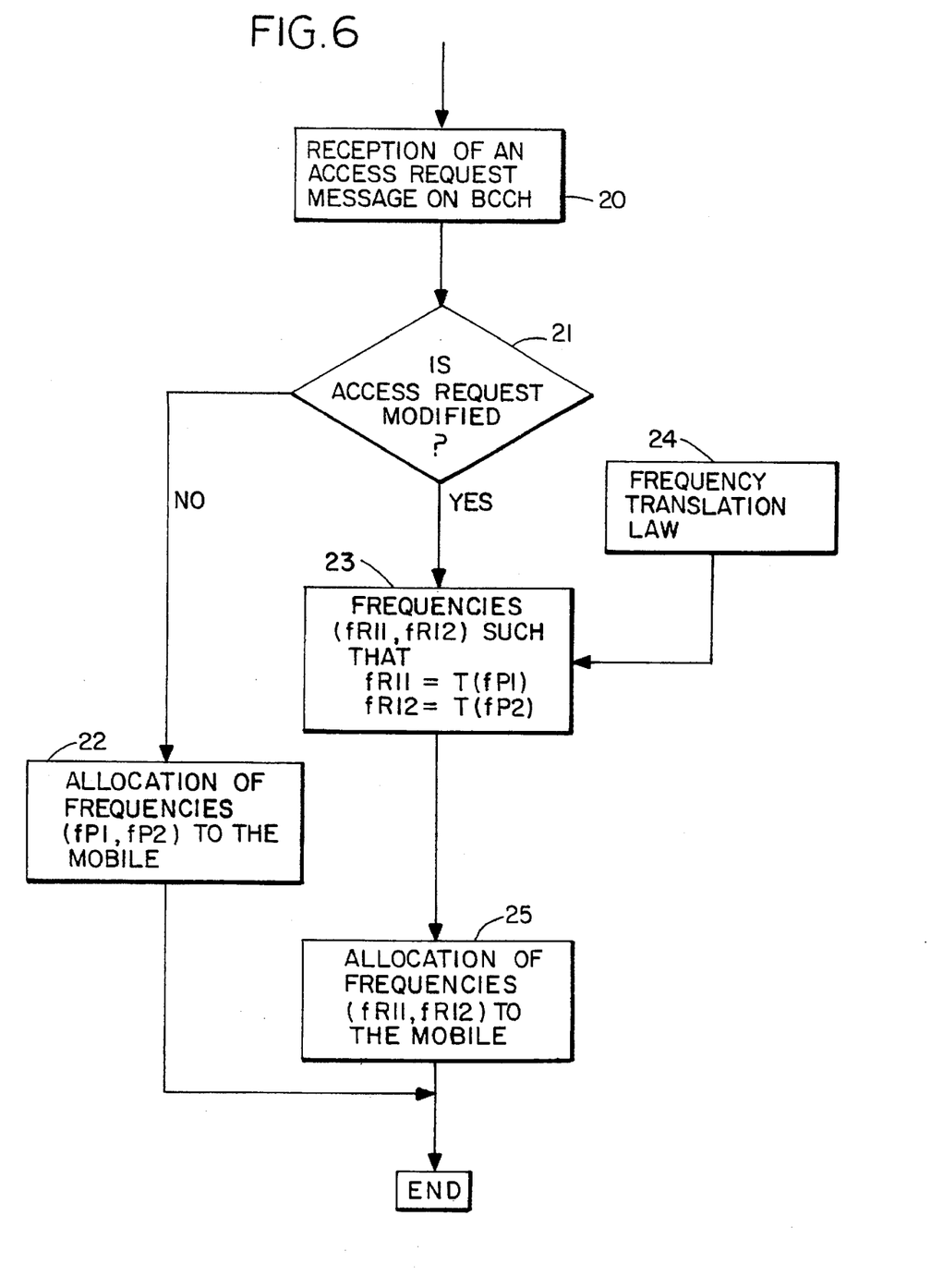
FIG. 6 shows a flow chart illustrating the method according to the invention.

On receiving the access request RA the base station controller BSC, through the intermediary of the base transceiver station, assigns the mobile station a traffic channel, i.e. a pair of frequencies (or several pairs if frequency hopping is used) and a specific time slot (steps 20, 21 and 22, FIG. 6). It also determines the timing advance with which the mobile station must transmit signals to allow for the propagation time of electromagnetic waves between the mobile station and the base transceiver station.

For the mobile station MS in the shadow area Z1 the signalling channel (BCCH in FIG. 4) from the base transceiver station BTSP received via the antenna A1 by the receiver RR11 of the booster R1 is retransmitted by the transmitter ER11 and the antenna A1 of the booster R1 on the translated frequency $f_{R11}$ of the broadcast control channel $f_{P1}$ to all mobile stations in the shadow area Z1. The mobile station MS receives the frequency $f_{R11}$ and regards this as the downward broadcast control channel; it deduces from it the translated frequency $f'_{R11}$ for the upward broadcast control channel $f'_{P1}$.

Figure 4:
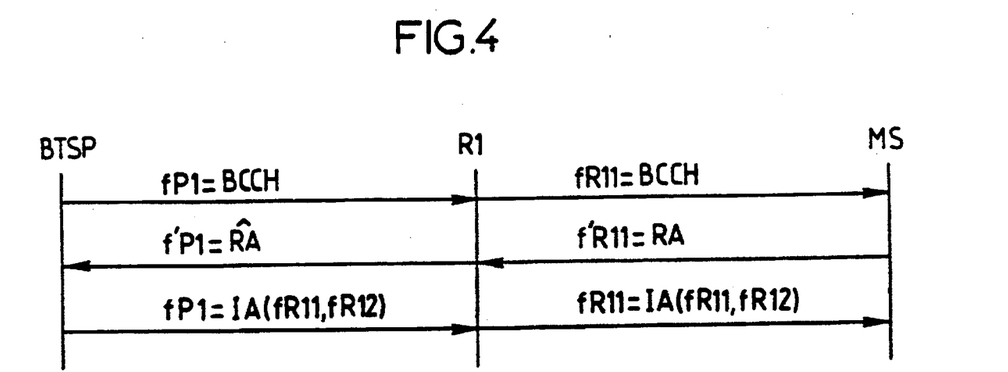
FIG. 4 shows some of the signals exchanged when a mobile station accesses the base transceiver station of the FIG. 1 cell using the method of the invention.

To access the base transceiver station BTSP the mobile station then sends an access request RÂ in time slot TS0 at the frequency $f'_{R11}$ (see FIG. 4).

In accordance with the invention, instead of retransmitting this access request on the upward broadcast control channel $f'_{P1}$ the booster R1 modifies it and then retransmits a modified access request RÂ to the base transceiver station BTSP.

Modification of the access request tells the base transceiver station BTSP and thus the base station controller BSC of the latter that the access request is from a mobile station in a shadow area. It also indicates, where appropriate, the class to which the shadow area in which the mobile station MS is located belongs.

A class of shadow area comprises all shadow areas using the same set of translated frequencies within the same cell, where more than one shadow area exists within the same cell. As already mentioned, the translated frequencies must be distributed in such a way that shadow areas close together do not use the same frequencies. However, to make best possible use of the frequency spectrum there may be more than one shadow area using the same set of frequencies provided that they are sufficiently far apart. In this example the shadow areas Z1 and Z3 are in the same class and the shadow area Z2 is in a different class.

To use separate sets of translated frequencies each shadow area class can be represented by a different translation law.

If the modified access request RÂ (step 21, FIG. 6) tells the base station controller BSC that the mobile station MS is in a shadow area and the class appropriate to this shadow area and thus the associated translation law, the base station controller BSC can assign to the mobile station MS, by way of the Immediate Assignment (IA) message transmitted by the base transceiver station BTSP, a channel, i.e. a frequency (or several frequencies if frequency hopping is used) and a specific time slot, the frequency or frequencies thus communicated ($f_{R11}$, $f_{R12}$) being the translated frequencies for the frequencies ($f_{P1}$, $f_{P2}$) that would have been communicated to it had it been outside the shadow area Z1 (steps 21, 23, 24 and 25, FIG. 6). The mobile station MS can deduce the upward frequencies once it knows these downward frequencies.

The remainder of the access procedure is entirely conventional.

As already mentioned, in accordance with the invention the mobile station MS must use only translated frequencies. If the conventional access procedure were used the message IA would contain not the translated frequencies but the associated basic frequencies ($f_{P1}$, $f_{P2}$) of the base transceiver station BTSP, which would therefore be unsuitable.

In a specific application mentioned here purely by way of illustrative example, the modification of the access request RÂ carried out by the booster R1 entails, rather than retransmitting the access request RÂ in time slot TS0, retransmitting it on another channel, called the modified access channel, at the frequency $f'_{P1}$ of the broadcast control channel.

Naturally, the modified access channel must be known not only to the base transceiver station BTSP but also to the base station controller BSC so that the latter expects to receive on this modified access channel an access request from a mobile station in a shadow area. The modified access channel can be used only to transmit modified access requests.

Figure 5:
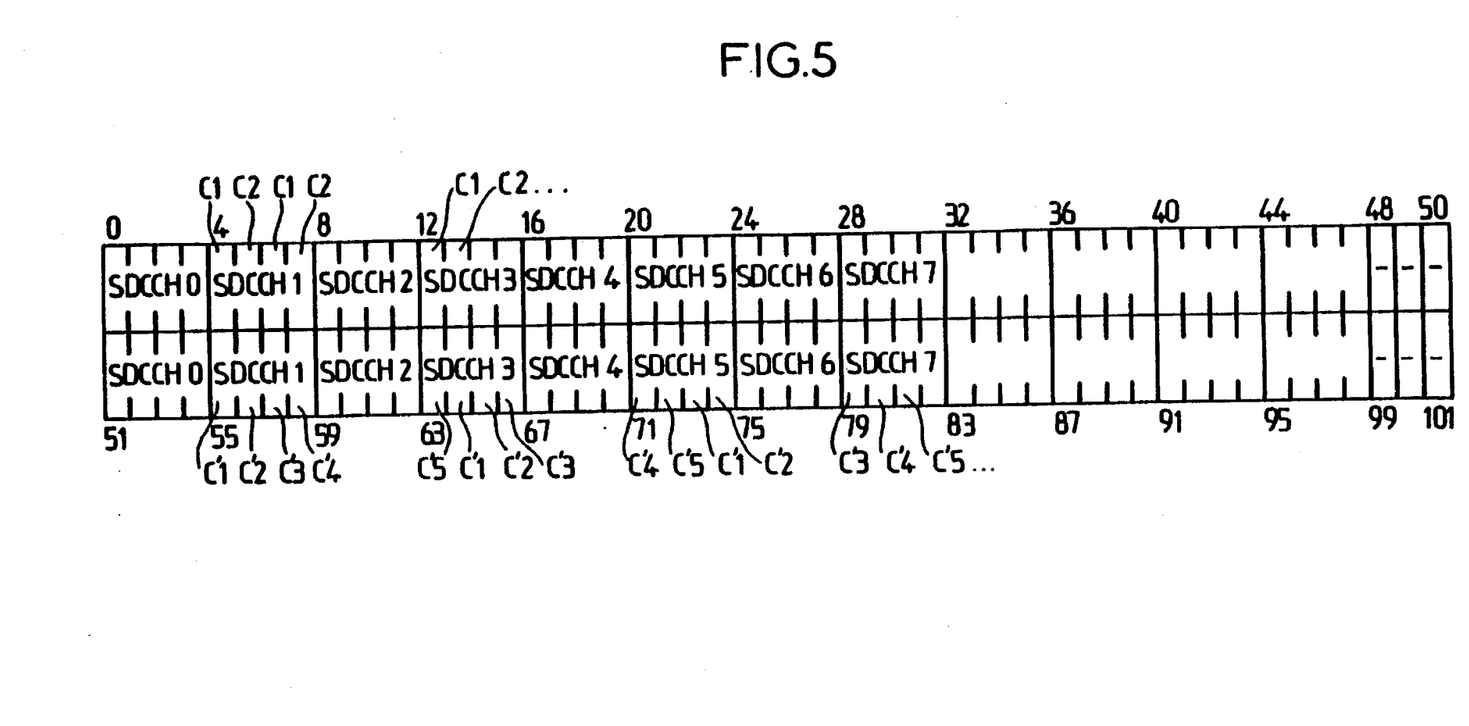
FIG. 5 is a diagram showing one possible configuration of the various radio transmission channels for the downward direction suitable for the method of the invention.

There follows a description with reference to FIG. 5 of one possible configuration of the traffic channels and access channels in a frame with eight SDDCH (Standalone Dedicated Control CHannels).

A conventional frame with eight SDCCH is described in "The GSM System for Mobile Communications", by M. MOULY and M. B. PAUTET, published by the authors, on pages 204 and 205.

In this configuration time is represented in the form of a helix and each box represents a time slot according to the time-division multiple access principle. The time slots are grouped into cycles of eight and the frame comprises 102 such cycles.

In the simplest form of this frame a channel corresponds to the repetition of a time slot every eight time slots. On the other hand, in the frame with eight SDCCH a given channel includes eight sub-channels, each sub-channel being called SDCCH and corresponding to a set of four time, slots, one per cycle of eight over four consecutive cycles, in the same time position relative to the cycle origin, and repeating every 51 cycles.

In FIG. 5, which shows the downward frame only, the SDCCH are marked SDCCH0 through SDCCH7. To clarify the description there is no discussion hereinafter of the use of sub-channels other than the SDCCH and the seven time slots separating one time slot of an SDCCH from the next time slot are not shown.

According to the invention, four of the eight SDCCH are reserved for traffic, for example: SDCCH0, SDCCH2, SDCCH4 and SDCCH6; the other four SDCCH, known as dedicated SDCCH, are reserved for modified access channels: SDCCH1, SDCCH3, SDCCH5 and SDCCH7.

If there are four shadow areas classes, for example, each of the four time slots constituting each dedicated SDCCH can be reserved to a separate shadow area class. If there are fewer or more than four shadow area classes the time slots of the dedicated SDCCH, in time order, are reserved in turn for each class (in FIG. 5, there is shown in the first half of the frame an example with two shadow area classes C1 and C2 and in the second half of the frame an example with five shadow area classes C'1 through C'5).

The duration of the access request messages RÂ is less than the duration of a time slot. The access requests are decoded, demodulated, modulated and coded again for retransmission by the booster R1 in the time slot of a dedicated SDCCH corresponding to the class of the shadow area Z1 in which the mobile station MS from which they originate is located. This retransmission is effected with the same timing advance, known as the partial timing advance, representing the distance between the mobile station MS and the booster R1, as that with which the booster R1 received the message RA.

It is therefore necessary for the booster R1 to be capable of measuring the timing advance, of course. It is sufficient to provide it with the appropriate means, which can be similar to those used by a conventional base transceiver station which has to implement this function.

The booster R1 also needs to know the partial timing advance in order to decode access requests RÂ received from the mobile station MS.

The fact that the boosters retransmit the modified access requests with the partial timing advance enables the base transceiver station BTSP to deduce the total timing advance directly. This is the sum of the partial timing advance and the timing advance representing the distance between the booster R1 and the base transceiver station BTSP. It is this total timing advance which must be communicated to the mobile station MS for delaying its subsequent transmissions, as all signals transmitted by the mobile station MS are relayed by the booster R1.

The base transceiver station BTSP decodes the modified access requests RÂ and, thanks to its internal clock, knows the timing reference of the time slot in which they were transmitted. It transmits this time reference to the base station controller BSC. As the base station controller BSC knows the modified frame configuration, it can deduce from it the shadow area class and therefore assign the mobile station MS an appropriate traffic channel.

If frequency hopping is applied in the cell CP, i.e. if the carrier frequencies used on a traffic channel change according to a predetermined repetition law, and if the number of frequencies used by the base transceiver station BTSP is greater than the number of translated frequencies used by the booster R1 (i.e. if some basic frequencies have no associated translated frequency), the base station controller BSC must assign to the mobile station MS a traffic channel using only translated frequencies associated with translated frequencies of the booster R1.

A possible alternative solution is to allocate the mobile station a channel with no frequency hopping, the frequency of this channel evidently being a translated frequency at the booster R1. A channel with no frequency hopping is typically the signalling channel (BCCH). However, it is possible to provide other channels with no frequency hopping when configuring the network.

In an alternative implementation the booster R1 can apply, in addition to the translation law T, a repetition law which is specific to it and which can be different from that applied by the base transceiver station BTSP to effect frequency hopping.

In this case, however, the signalling channel carried by the broadcast control channel is always a channel with no frequency hopping, both at the base transceiver station BTSP and at the booster R1.

This implementation does not cause any problems if the base transceiver station BTSP and the booster R1 use the same number of frequencies.

If the booster R1 uses fewer frequencies than the base transceiver station BTSP (in particular if few frequencies are available for the shadow areas), it is feasible not to apply frequency hopping in area Z1 although it is applied in CP. In this case, the repetition law for the area Z1 is significantly different from that for the cell CP.

If the booster R1 uses more frequencies than the base transceiver station BTSP (for example in the event of fading in the shadow area Z1), i.e. if some basic frequencies are associated with more than one translated frequency, it is feasible to apply frequency hopping in area Z1 but not in cell CP. Once again, the repetition law specific to area Z1 is significantly different from that associated with cell CP.

In the latter case, an appropriate law for selecting the translated frequency in the downward direction must be applied by the booster R1 to retransmit the received signals, since it can retransmit on more than one translated frequency a signal conveyed by a single basic frequency.

If the repetition laws used by the boosters are different from those used by the base transceiver stations it is possible to define shadow area classes not only by the associated translation law but also by the repetition law. This makes it possible to increase the diversity of the booster classes and therefore to reduce further the risk of interference.

When frequency hopping is used in a GSM type network, the translation law must be an increasing monotonous function. In GSM type networks a repetition law is defined by a list of frequencies to be used and by a law for choosing from this list, this law being used to determine that a given frequency, for example the ith frequency, must be used at a given time.

If the translation law is not an increasing monotonous function, for example if it interchanges the order of the first two frequencies, when the base transceiver station BTSP transmits on the first of these two frequencies the booster R1 retransmits on the second translated frequency instead of the first.

There follows a description of the specific features of the handover procedure associated with the method of the invention.

In the conventional way, when a mobile station is accessing a base transceiver station it knows the broadcast control channel frequencies of the adjoining cells. It therefore "monitors" these broadcast control channels on the signalling channel and measures the level at which it receives them as well as the level at which it receives the broadcast control channel of the cell which it is currently accessing, referred to as the "old cell". The measured values are transmitted to the base transceiver station of the old cell, which compares the various receive levels.

As soon as the receive level of the broadcast control channel of the old cell is below the receive level of one of the other broadcast control channels, the base transceiver station advises the base station controller of this to tell it that a change of base transceiver station (handover) is desirable. The mobile station then receives a handover instruction which assigns it a traffic channel from the base station controller, via the base transceiver station of the old cell. The mobile station then transmits access messages specific to the handover procedure to the base transceiver station of the new cell which it is to access, in order for the latter to determine the timing advance to be used by the mobile station.

In accordance with the invention, a mobile station in cell CP or in area Z1, Z2 or Z3 knows, in addition to the frequencies of the broadcast control channels of the adjoining cells, the translated frequencies associated with the frequency $f_{P1}$ in areas Z1, Z2 and Z3, i.e. the frequencies $f_{R11}$ and $f_{R21}$ (remember that areas Z1 and Z3 are of the same class and therefore use the same translated frequencies); it measures their receive level in the same way.

The mobile station MS in the shadow area Z1 transmits its measured values on the translated frequency of the upward broadcast control channel $f'_{R11}$ to the base transceiver station BTSP; these measured values are transmitted to the base transceiver station BTSP on the upward broadcast control channel $f'_{P1}$ via the booster R1. When the measured values indicate that the mobile station MS should access CP rather than the shadow area Z1, for example if the receive level for $f_{P1}$ is greater than that for $f_{R11}$, a conventional handover procedure ensues, as if the shadow area Z1 were a normal cell and the booster R1 a conventional base transceiver station.

If the measured values of a mobile station accessing the base transceiver station BTSP and outside any shadow area or accessing the base transceiver station BTSP through a booster covering a first shadow area indicate that the receive level for $f_{R11}$ is greater than that for $f_{P1}$ or $f_{R22}$, then the base transceiver station BTSP communicates to the base station controller BSC the broadcast control channel received best. The base station controller BSC knows that this broadcast control channel cannot be the broadcast control channel of an adjoining cell and that it is not that of the old cell. The base station controller BSC then has only to apply to this frequency the converse translation law to determine the class of the associated shadow area and thus, by means of an appropriate message, to assign a correct traffic channel to the mobile station, i.e. a traffic channel using translated frequencies.

The remainder of the procedure is the same as conventional handover.

The base station controller BSC knows all the translated frequencies used in the various shadow areas. The base transceiver station BTSP necessarily holds in memory, and therefore knows, the translated frequencies associated with its broadcast control channel, in order to be able to avoid instigating handover to itself.

In accordance with a final aspect of the present invention the boosters can be controlled and monitored by radio from the network operation and maintenance centre using the downward SDCCH corresponding to the dedicated upward SDCCH, for example.

The control function consists in sending to the boosters information as to changes to the radio configuration, for example (changing of modified access channels, modification of the associated translation law, etc).

As for monitoring, this can consist in sending a status request to the booster periodically, for example, to which the booster responds by radio.

Of course, the invention is not limited to the embodiment just described.

Firstly, the method of the invention can be applied in the case of a GSM or other type cellular system.

The method of modifying the access requests can be different from that described, providing it enables the control means to tell that a mobile is in a shadow area and the class of that shadow area, if necessary.

A complete channel of a simpler frame could be used rather than half the SDCCH in a frame of eight SDCCH, for example.

Also, to modify the received access request RÂ it is not necessary to decode it and then demodulate it first. However, in this case, even if the implementation is less complex at the booster, it involves a loss of time slots, in particular because a complete time slot is needed for each class if there is more than one class of shadow area. However, it may be feasible to use fewer time slots than there are shadow classes, for example, by retransmitting only access requests whose level is above a predetermined threshold, which would reduce the number of traffic channels translated into modified access channels.

Also, instead of executing a handover procedure on moving from one shadow area booster to another or to a base transceiver station, or on moving from a base transceiver station to a shadow area booster, the mobile station could be sent a message of the "Frequency Redefinition" type, to use the GSM terminology. This message is a conventional message for reconfiguring frequencies in the network and will include in these various cases the new frequencies to be used by the mobile station, for example the translated frequencies of the shadow area which it must access.

Another possible application of the method of the invention is to provide boosters at the extreme range of the base transceiver station transmitters, especially in two-way transmission media (roads, railroads) for very large radius cells (35 km). This increases the cell range without increasing the number of transmission sites requiring cable connections, which is particularly advantageous.

Finally, any means as described herein can be replaced by equivalent means without departing from the scope of the invention.

There is claimed:

1. A method of ensuring service to shadow areas in a cellular mobile radio system comprising a plurality of cells each covered by a base transceiver station adapted to transmit and to receive radio signals to and from mobile stations in an associated cell on different frequencies, at least one of said shadow areas being in one of said cells, a radio booster being associated with each of said shadow areas to receive, amplify and retransmit said radio signals to and from mobile stations in said shadow area, said radio booster being adapted to cover a given shadow area being subordinate to said base transceiver station of said associated cell in which said shadow area is located, said method comprising the steps of:

establishing a radio connection between (1) a base transceiver station in a cell having an associated shadow area and a radio booster, and (2) one of said mobile stations located in said associated shadow area, said establishing step comprising the steps of:

transmitting, from said mobile station to said radio booster, an access request radio signal on a predetermined access channel conveyed by an upward translated control frequency;

modifying, at said radio booster, said access request radio signal to include information indicating that said mobile station is in a shadow area, to obtain a modified access request radio signal;

retransmitting said modified access request radio signal from said radio booster to a base station controller within said base transceiver station on an upward control frequency different from said upward translated control frequency;

assigning, at said base station controller, a traffic channel conveyed by at least one translated traffic frequency to said mobile station which said mobile station must use to communicate with said radio booster, said assigning step comprising the steps of:

determining, by said base transceiver station, on receiving said modified access request radio signal, that said mobile station is in said associated shadow area and that a frequency translation law has to be used, said frequency translation law associating translated traffic frequencies to respective traffic frequencies; and deducing from at least one traffic frequency which is selected by said base transceiver station to communicate with said radio booster for establishing said radio connection and from said frequency translation law at least one translated traffic frequency which has to be used by said mobile station to communicate with said radio booster for establishing said radio connection;

transmitting, from said base transceiver station to said radio booster on a downward control frequency, a signal adapted to advise said mobile station that it must use said at least one translated traffic frequency for establishing said radio connection; and retransmitting, from said radio booster to said mobile station said signal on a downward translated control frequency.

2. The method according to claim 1, wherein said step of retransmitting said modified access request radio signal comprises the step of retransmitting said modified access request radio signal with a partial timing advance corresponding to a distance between said radio booster and said mobile station so that a timing advance thereafter indicated by said base transceiver station to said mobile station, and to be used subsequently by said mobile station to transmit radio signals to said base transceiver station, corresponds to a sum of said partial timing advance and said timing advance corresponding to the distance between said radio booster and said base transceiver station.

3. The method according to claim 1, wherein when frequency hopping is used in a cell in which there is a shadow area and when said radio booster associated with said shadow area uses fewer frequencies than said base transceiver station of said cell, said step of assigning said traffic channel comprises the step of assigning a traffic channel to said mobile station in said shadow area which is conveyed by said at least one translated traffic frequency having an associated translated frequency.

4. The method according to claim 1, wherein when frequency hopping is used in a cell in which there is a shadow area and when said radio booster associated with said shadow area uses fewer frequencies than said base transceiver station of said cell, said step of assigning said traffic channel comprises the step of assigning a traffic channel to said mobile station in said shadow area which is a channel with no frequency hopping.

5. The method according to claim 1, further comprising the step of storing in said base station controller all upward and downward translated control frequencies corresponding to all upward and downward control frequencies.

6. The method according to claim 5, wherein accessing a radio booster of a second shadow area from a mobile station in a first shadow area comprises the steps of:

accessing, from said mobile station, said base transceiver station corresponding to said first shadow area;

transmitting information from said base transceiver station to said base station controller indicating said translated control frequency associated with said second shadow area;

extracting at said base station controller said information and deducing from said information a translation law for obtaining the translated frequencies associated with said second shadow area; and transmitting a signal from said base station controller to said mobile station indicating which translated traffic frequencies are used by said radio booster of said second shadow area.

7. The method according to claim 6, further comprising the step of storing in said base transceiver station all upward and downward translated control frequencies associated with all upward and downward control frequencies of said base transceiver station by said translation law.

8. The method according to claim 1, wherein said step of assigning said at least one translated traffic frequency comprises the steps of:

assigning said at least one translated traffic frequency such that adjoining shadow areas use separate sets of translated traffic frequencies to avoid interference; and defining classes of shadow areas, a shadow area class comprising all shadow areas using the same set of translated traffic frequencies and being represented by a translation law different from those representing other shadow area classes.

9. The method according to claim 8, further comprising the steps of:

performing frequency hopping in said shadow areas of said cell by means of a repetition law, wherein the repetition law used by radio boosters associated with said shadow areas is the same as a repetition law used by said base transceiver station of said cell, a signalling channel conveyed by an upward translated control channel being always a channel with no frequency hopping.

10. The method according to claim 9, further comprising the step of deducing, at said base station controller, said shadow class of said shadow area from said modified access request radio signal.

11. The method according to claim 10, wherein when said cellular mobile radio system uses time-division multiple access, said step of modifying said access request radio signal comprises the step of retransmitting said access request radio signal on a modified access channel whose position in time is different from that of said access channel, said modified access channel being recognized by said base station controller as one specific to retransmission of access request radio signals from mobile stations in a predetermined class of shadow area.

12. The method according to claim 11, further comprising the step of using a position in time which is conveyed by said downward control frequency and which is associated with said position in time of said modified access request on said upward control frequency for controlling and monitoring said radio booster.

13. The method according to claim 8, further comprising the steps of:

performing frequency hopping in said shadow areas of said cell by means of a repetition law, wherein the repetition law used by said radio boosters associated with said shadow areas is different from a repetition law used by said base transceiver station of said cell, a signalling channel conveyed by said broadcast control channel being always a channel with no frequency hopping.

14. The method according to claim 1, further comprising the step of directly accessing said base transceiver station from said mobile station via said radio booster in said associated shadow area via a handover procedure.

15. The method according to claim 1, wherein said translation law is an increasing monotonous function when said cellular mobile radio system performs frequency hopping.

16. The method according to claim 1, wherein said translation law to be used by each of said radio boosters is supplied at time of design of said cellular mobile radio system, said translation law being modifiable.

17. A radio booster in a mobile radio system comprising a plurality of cells, for ensuring radiocommunications in a shadow area included in a cell covered by a transceiver station cell, said radio booster comprising:

means for modifying an access request radio signal received on an upward translated control frequency from a mobile station belonging to said shadow area, to include information indicating that said mobile station is in a shadow area, to obtain a modified access request radio signal, said access request radio signal being sent by said mobile station for establishing a radio connection;

means for retransmitting said modified access request radio signal to said base transceiver station on an upward control frequency different from said upward translated control frequency, thereby informing said base transceiver station that said mobile station is in said shadow area and that a frequency translation law has to be used for deducing a translated traffic frequency which has to be used by said mobile station to communicate with said radio booster from a traffic frequency which is selected by said base transceiver station to communicate with said radio booster when establishing said radio connection with said mobile station.

* * * * *